(12) United States Patent
Janian

(10) Patent No.: US 7,159,857 B2
(45) Date of Patent: Jan. 9, 2007

(54) MULTI SPRING RING

(76) Inventor: Robert Janian, 3845 Ballina Canyon Rd., Encino, CA (US) 91436

( * ) Notice: Subject to any disclaimer, the term of this patent is extended or adjusted under 35 U.S.C. 154(b) by 0 days.

(21) Appl. No.: 10/853,852

(22) Filed: May 24, 2004

(65) Prior Publication Data
US 2006/0033251 A1  Feb. 16, 2006

(51) Int. Cl.
*F16F 1/20* (2006.01)
(52) U.S. Cl. .................... 267/164; 267/158
(58) Field of Classification Search ............ 267/164, 267/165, 158, 144, 107, 109, 160; 277/553, 277/554, 555, 557
See application file for complete search history.

(56) References Cited
U.S. PATENT DOCUMENTS

| | | | | |
|---|---|---|---|---|
| 1,969,008 A | * | 8/1934 | Hubbard | 277/555 |
| 4,328,972 A | * | 5/1982 | Albertson et al. | 277/553 |
| 4,508,356 A | * | 4/1985 | Janian | 277/555 |
| 4,572,921 A | * | 2/1986 | May et al. | 267/165 |
| 4,585,239 A | * | 4/1986 | Nicholson | 277/555 |
| 4,919,403 A | * | 4/1990 | Bartholomew | 267/165 |
| 5,037,281 A | * | 8/1991 | Lane et al. | 277/399 |
| 5,160,121 A | * | 11/1992 | Bartholomew | 267/136 |
| 5,163,692 A | * | 11/1992 | Schofield et al. | 277/555 |
| 5,630,591 A | * | 5/1997 | Drijver et al. | 277/553 |
| 5,799,953 A | * | 9/1998 | Henderson | 277/554 |
| 6,688,604 B1 | * | 2/2004 | Hashimoto | 277/558 |

* cited by examiner

*Primary Examiner*—Thomas Williams

(57) ABSTRACT

A mechanical spring energized sealing device comprising in combination an elastomeric jacket and variety of resilient metallic springs inserted inside one uniform jacket casing, there are variety of energizer springs which are used for different needs in marketplace, depending on whatever application calls for, this patent allows us to use most spring energizers in addition to some new angular canted type spring which fits inside one uniform jacket.

2 Claims, 5 Drawing Sheets

MULTI SPRING RING

BACKGROUND OF THE INVENTION

This invention relates to mechanical sealing devices containing a deformable cover or jacket element typically made of elastomeric and or Teflon materials and a metallic resilient spring energizer which readily inserted into this jacket and locked in place. A number of different configurations of mechanical spring seals are known, as for example my prior U.S. Pat. Nos. 4,133,542 and 4,508,356 and where These types of seals are used in a variety of applications which calls for different types of energizers, typically all existing jacket elements are manufactured for only one specific type of energizer and if one needs to change any of springs one needs to manufacture a completely new jacket or cover thus creating a huge problem since a completely new jacket has to be manufactured, since this types of seals are increasingly being used in a variety of applications under consistently changing environments where one type of expander cannot perform as well as another when working conditions change at which internal spring element has to be replaced with another type, this patent allows us to simply replace spring element with another on the site. This patent also makes it possible to use a modified angular "C" (Ref. my previous U.S. Pat. No. 4,508,356) along with tapered notched configuration which is explained in summary of this invention.

SUMMARY OF THE INVENTION

In accordance with the present invention, a jacket and a novel spring along with several previously configured springs existing in current marketplace are easily insertible and substituted in one uniform jacket cavity, particularly one type of spring that allows us to use same cavity depth with a much longer cantilever arm, this makes it possible to maintain greater resiliency with smaller jacket cavity length, it also makes it possible to create thicker heels for smaller gland widths to prevent seal extrusion due to higher system pressures.

BRIEF DESCRIPTION OF THE INVENTION

Figure 1:
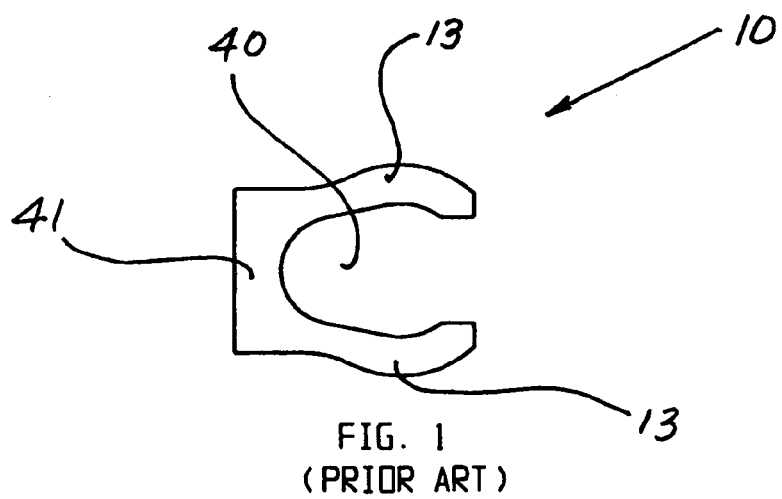

Having thus described the invention in general terms, reference will now be made to the description below taken in conjunction with the accompanying drawings wherein:

FIG. 1. Is a typical cross sectional view of a mechanical spring seal jacket 10 with a typical cavity 40, heel 41, and sealing lips 13.

Figure 2:
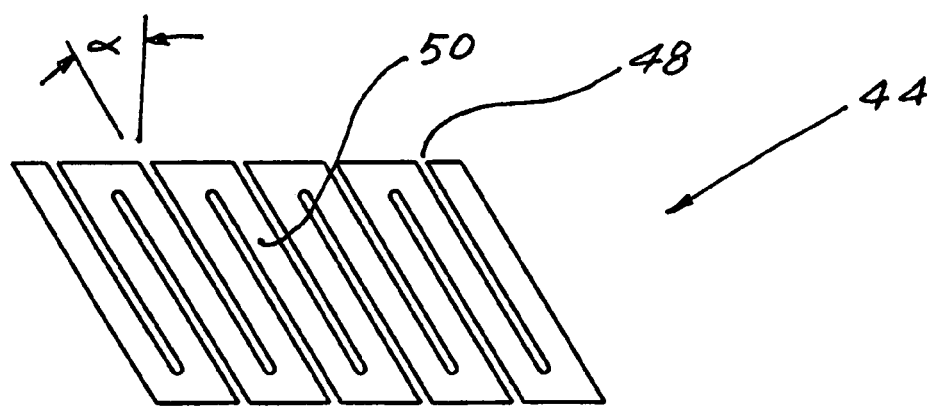

FIG. 2. Shows a flat spring strip 44 cut according to this invention with notches 48, ribs 50 cut in angular form (∝)

Figure 3:
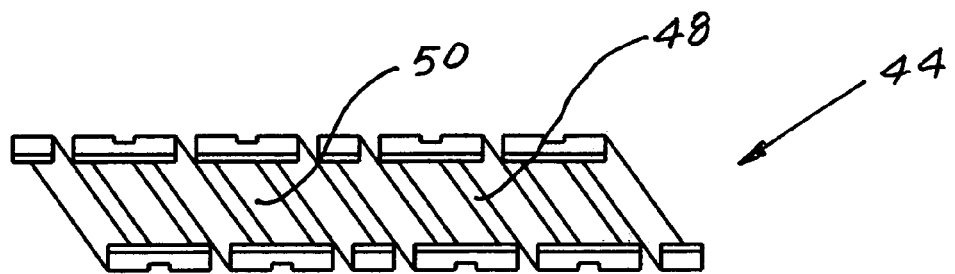

FIG. 3. Is formed frontal view of claimed spring 44 of FIG. 2

Figure 4:
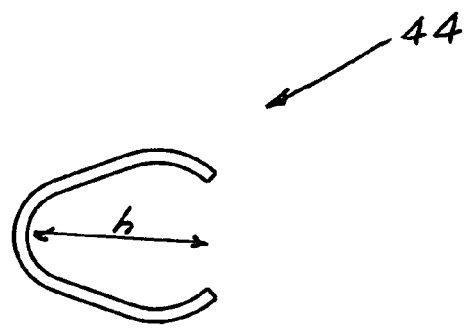

FIG. 4. Is cross-sectional view of claimed spring 44 of FIG. 3

Figure 5:
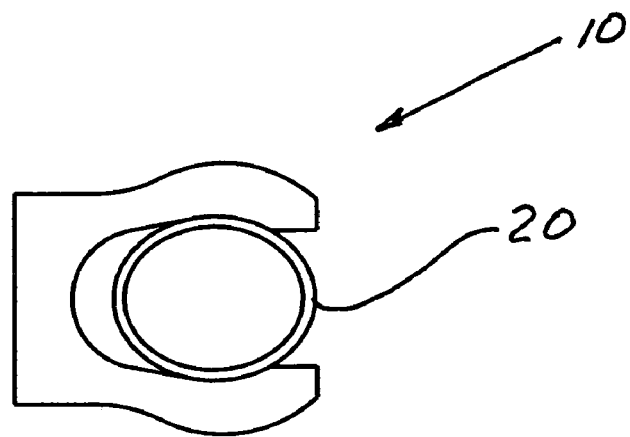

FIG. 5. Shows seal jacket 10 of FIG. 1 containing a spring element of canted coil spring 20

Figure 6:
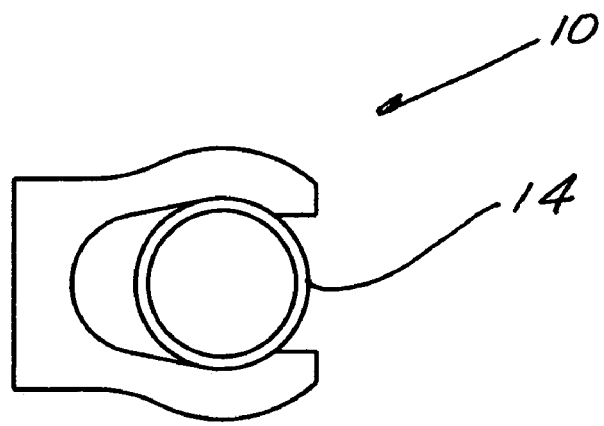

FIG. 6. Shows a flat ribbon coil spring 14 fitted inside jacket 10

Figure 7:
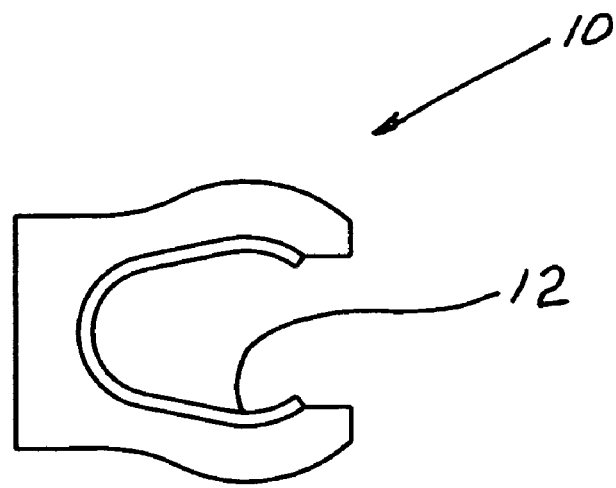

FIG. 7. Is a prior art modified "C" spring 12 inserted inside jacket 10 of FIG. 1

Figure 8:
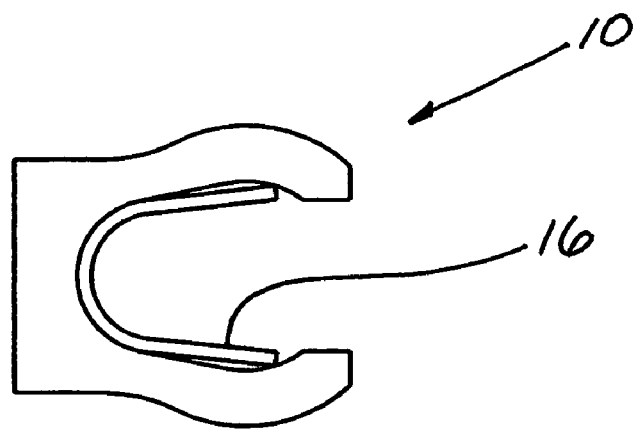

FIG. 8. Shows a commonly used straight cantilever U or V type spring 16 inside jacket 10 of FIG. 1.

Figure 9:
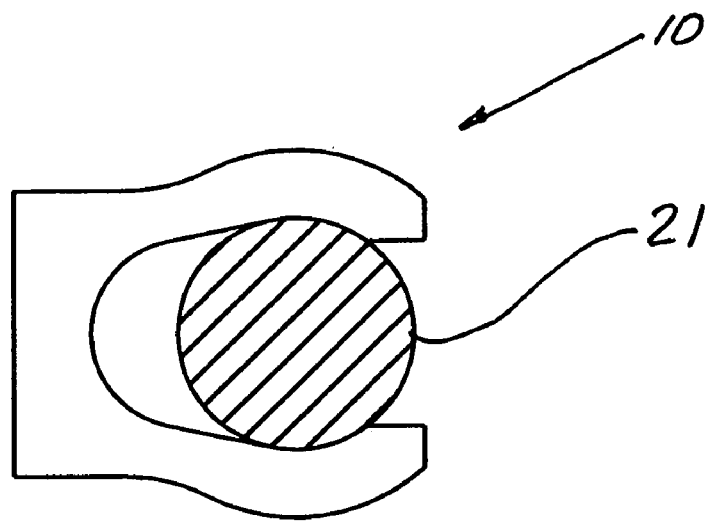

FIG. 9. Is a commonly used standard elastomeric O-ring 21 inserted inside the jacket 10 of FIG. 1

Figure 10:
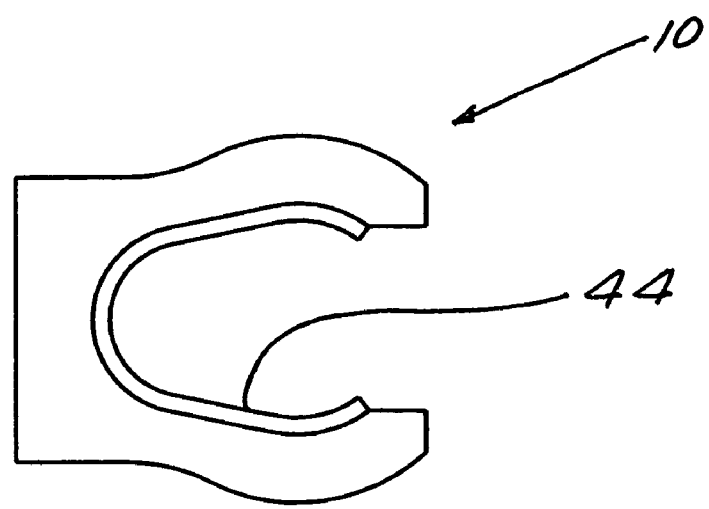

FIG. 10. Shows angular notched spring 44 of this invention inserted inside jacket 10 in FIG. 1, as it is obvious, one may not notice any difference in cross-section between FIG. 7 and FIG. 10 and yet spring 44 has longer arms 50 than spring 12 in FIG. 7

FIG. 11. Is respective cross sectional view and side view of prior art "Modified C) spring 12 of FIG. 7

FIG. 12. is respective cross-sectional view and side view of claimed spring

FIG. 13. shows cross-sectional and side view of a commonly used "Cantilever U type spring with commonly used straight arms.

FIG. 14. shows "U" type spring cross-sectional view and side view of claimed spring with angular arms 50

DETAILED DESCRIPTION OF THE INVENTION

FIG. 1 shows typical cross sectional form of a jacket or cover made of sealing materials such as Nylon or Teflon consisting of typical cavity 40, sealing lips 13 and heel 41, where cavity 40 accepts spring element 44 of this invention, canted coil 20 of FIG. 5, flat ribbon coil 14 of FIG. 6, modified "C" shape 12 of FIG. 7, straight cantilever "U" or "V" 16 of FIG. 8 and elastomeric O-ring 21 of FIG. 9.

As best seen in FIG. 2 spring element 44 fabricated with angled (α) notches 48 and arms 50 with alpha being anywhere between 5 and 45 degrees formed into FIG. 3, with this configuration length of arm 50 is increased without affecting the spring height (h) and overall seal assembly length thus resulting more resiliency in overall seal performance and with this configuration seal glands fabricated in industry, particularly in aerospace where smaller and lighter with more efficient units are needed could be very effective tool, since various types of jacket 10 materials can be employed, including, in addition to Nylon or Teflon, the durability of these materials are enhanced by the constant pressure and fatigue as forces being exerted on sealing lips 13 of FIG. 1 even though these jacket materials may become hardened and brittle as a result of operation, spring element should keep it's resiliency so that seal assembly of FIG. 10 could maintain it's overall performance.

Since there may be some changes and modifications of the invention by those skilled in the art without departing from the invention concept, the invention is not to be taken as limited except by the scope of appended claims.

What is claimed is:

1. A resilient spring element, comprising: a flat body portion defining a plane and having a central axis, a plurality of angled interdigitated notches formed on opposite sides of the central axis, each angled notch lies in the plane and defines a lateral axis, wherein, an angle between the central axis and the lateral axis is from about 5 degrees and 45 degrees.

2. The resilient spring as set forth in claim 1, wherein the resilient spring element is a metal.

* * * * *